Figures 1, 1A:
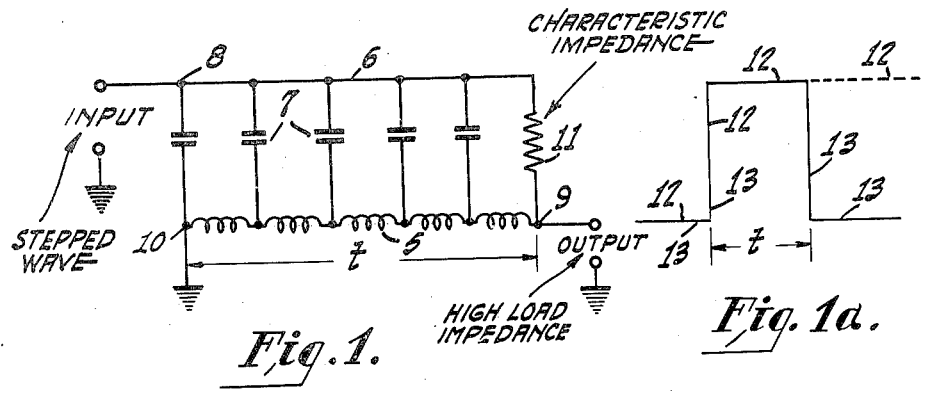

March 29, 1949.  A. D. BLUMLEIN  2,465,840
ELECTRICAL NETWORK FOR FORMING
AND SHAPING ELECTRICAL WAVES Filed Aug. 30, 1944  3 Sheets-Sheet 1

INVENTOR.
ALAN DOWER BLUMLEIN, DECEASED
By DOREEN WALKER, EXECUTRIX
By H. G. Grover
ATTORNEY

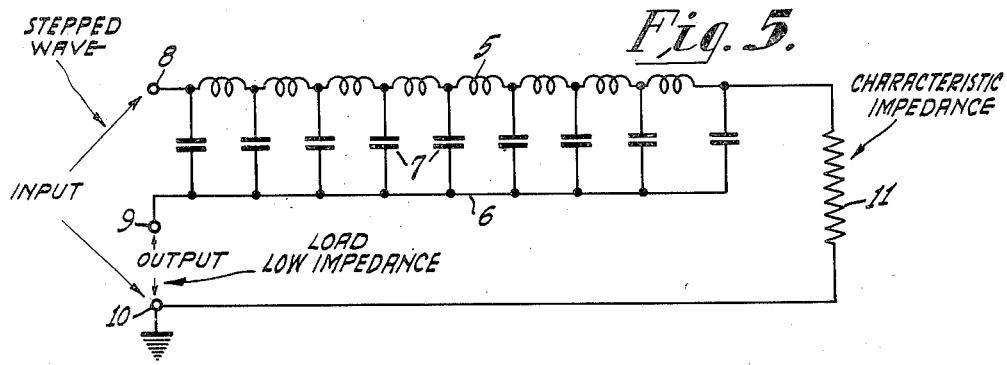
Fig. 5.
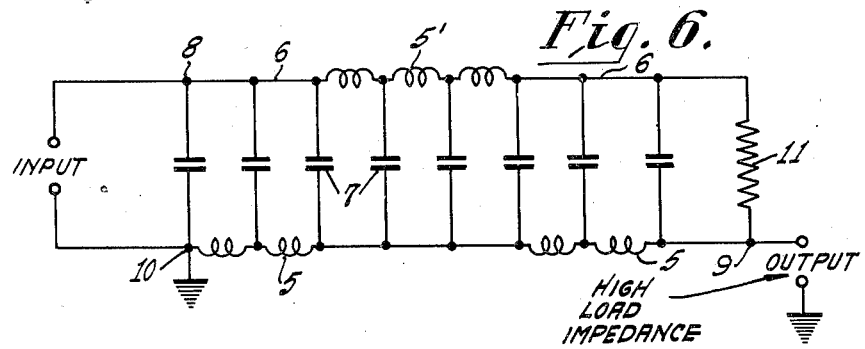
Fig. 6.
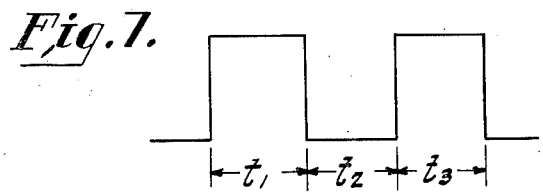
Fig. 7.
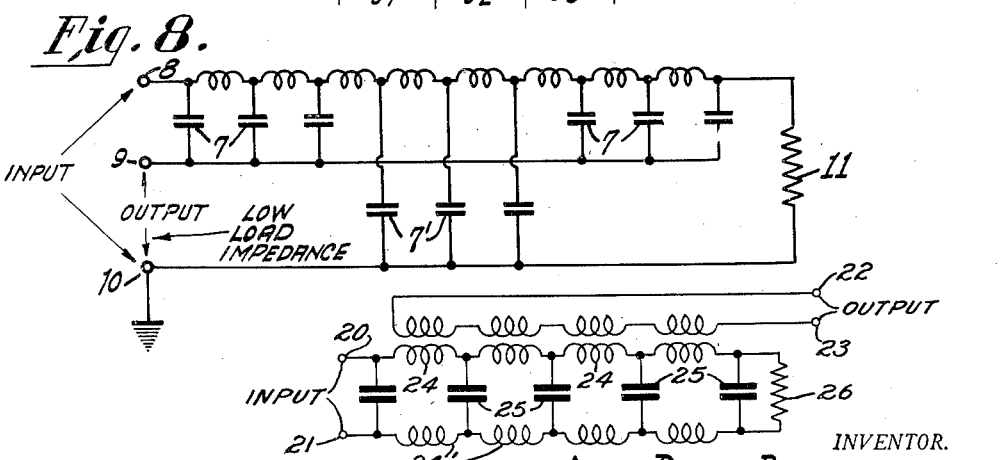
Fig. 8.
Fig. 9a.
INVENTOR.
ALAN DOWER BLUMLEIN, DECEASED
BY DOREEN WALKER, EXECUTRIX
By H. G. Grover
ATTORNEY March 29, 1949.   A. D. BLUMLEIN   2,465,840
ELECTRICAL NETWORK FOR FORMING
AND SHAPING ELECTRICAL WAVES
Filed Aug. 30, 1944   3 Sheets-Sheet 3

INVENTOR.
ALAN DOWER BLUMLEIN, DECEASED
BY DOREEN WALKER, EXECUTRIX
BY H. G. Grover
ATTORNEY Patented Mar. 29, 1949

2,465,840

UNITED STATES PATENT OFFICE 2,465,840

ELECTRICAL NETWORK FOR FORMING AND SHAPING ELECTRICAL WAVES

Alan Dower Blumlein, deceased, late of Ealing, London W. 5, England, by Doreen Walker, legal representative, Lanherne Lescudjack, Penzance, England, assignor to Electric and Musical Industries, Limited, a British corporation Application August 30, 1944, Serial No. 551,954
In Great Britain June 17, 1942

Section 1, Public Law 690, August 8, 1946
Patent expires June 17, 1962

12 Claims. (Cl. 178—44)

This invention relates to circuit arrangements having predetermined frequency characteristics and to such arrangements adapted for the generation of electric waveforms or for serving as filter networks.

For the purpose of generating a short pulse under the control of a pulse of longer duration it has been suggested to apply the pulse of longer duration to a terminated delay network provided with two tapping points which are connected to a device responsive to the difference of voltage which is set up in operation between the two tapping points. The pulse of longer duration when it arrives at the first tapping point may serve to switch the device into operation and thereafter the device remains in the operative condition until the pulse of longer duration arrives at the second tapping point where it operates to switch said device into the inoperative condition, the output of the device constituting the pulse of short duration. It has also been proposed to employ a delay network which is properly terminated at the input end but which is misterminated at the opposite end. The pulse of longer duration is applied to the input end of the network and travels along the delay network until it reaches the misterminated end where it is reflected and on reaching the input end serves to cancel the applied pulse. Both of these arrangements function to generate a short pulse from a pulse of longer duration, the short pulse being constituted in effect by the original wave form less the original waveform delayed. If the applied pulse is in the form of a single step the derived waveform consists of the step waveform less that waveform delayed by an amount determined by the delay of the network, that is to say, the output consists of a short pulse.

These prior proposals, however, are found to be disadvantageous since, in the first proposal, in order to generate a pulse it is necessary to employ a device such as a thermionic valve which is responsive to the differenec of voltage between the two tapping points on the delay network and in the second-mentioned prior proposal the arrangement employed does not present a constant impedance during operation either to the source which applies the waveform to the input end of the network or to the load or output circuit in which the derived waveform is set up.

It is an object of the present invention to provide an improved circuit arrangement for the generation of impulsive waveforms whereby either or both of these disadvantages can be overcome.

In the present invention these difficulties in the use of a delay network for generating impulsive waveforms are overcome by so connecting the output circuit in which the desired impulsive waveform is to be generated to the delay network that when a waveform is applied to the delay network there is fed to the output a plurality of derived waveforms of different time delays and which are time derivations of the applied waveform.

In British Patent No. 517,516 (U. S. Patent 2,263,376) there are described various circuit arrangements which may be constructed to possess a predetermined characteristic or characteristics and which may be used as filter networks. An important principle which may be employed in constructing such circuits and which is set out in the aforesaid patent is that an electric wave transmission network which has a given response with respect to the frequency of a harmonic wave applied to the network, necessarily has a response to a wave of step form, such as the Heaviside unit impulse, which is determined in terms of said given response; conversely, if the network possesses the latter kind of response it necessarily possesses the former. With networks of a certain form proposed in the aforesaid patent it is a comparatively simple matter to arrange that the network shall have a predetermined response to an applied wave to step form; if therefore this predetermined response corresponds to a desired frequency response the network will automatically function with the desired frequency response. Knowing the desired frequency response the step-wave response may be calculated and accordingly the network may be constructed so as to operate in the desired manner when harmonic waves are applied.

Circuits of the form described in the aforesaid patent are, however, apt to possess a high degree of complexity or a large loss which in either case tends to render them inconvenient in practice. Thus, in one of the arrangements described in the said patent there is provided a delay network with a number of tapping points arranged along its length, these tapping points being connected to the control grids of a number of valves, which valves are arranged to feed into an output circuit. If a stepped waveform is applied to the input of the delay network, this waveform propagates down the network and sets up in the output circuit a number of replicas of itself, the number depending on the number of tapping points on the network, and these replicas are displaced in time phase by the delays corresponding to the various tappings and have magnitudes depending, for example, on the gains of the different valves. By using a very large number of tapping points on the delay network and suitably choosing, for example, the gains of the valves associated therewith, it will be seen that the application of a stepped waveform to the input of the delay network can be made to set up with a high degree of accuracy a desired waveform in the output circuit. It will be appreciated, however, that this result is only achieved by the use of a large number of tapping points and amplifying valves. The arrangement is thus highly complex. In another arrangement described in the aforesaid patent, this complexity is avoided by replacing the valves by a large number of resistance circuits. Thus each tapping point is connected to ground through a high-resistance and through a common resistance of low value. The magnitudes of the various high resistances determine the currents which flow in the common resistance, and thus have the same effect as the different gains of the amplifier valves in the previously described arrangement. Since it is highly desirable that the contributions made to the current flowing in the common resistance should be independent of one another, it will be appreciated that the various high resistances feeding the common resistance must be of very large magnitude compared therewith. This involves a very high degree of attenuation of the applied signal. Thus the high degree of complexity of the formerly described circuit is only overcome at the expense of a large loss in the simplified circuit.

It is a further object of the present invention to provide circuits constructed according to the principle of the aforesaid patent but in which these disadvantages are reduced or eliminated. Such circuits may not only be used as filter networks bu also for generating pulses of predetermined form.

In the present invention the difficulties referred to in connection with said prior patent are overcome by arranging that instead of feeding to the output circuit waveforms which are replicas of the applied waveform, modified only in amplitude and time delay, there is fed to the output circuit waveforms which are time derivatives of the applied waveform, the said derivatives differing from one another in time delay and in amplitude.

Thus, according to the present invention there is provided an electric circuit arrangement having a predetermined frequency characteristic comprising a delay network having series and shunt elements forming a cascade of sections and an input circuit and an output circuit so connected to elements of said network that on the application of a waveform to said network by said input circuit there is fed to said output circuit a plurality of derived waveforms of differing time delay which are time derivatives or substantially time derivatives of said waveform or of said waveform as developed at points along the length of said delay network.

In one aspect, the invention is particularly applicable to the generation of an output wave which is representative of an input wave less the input wave delayed. For example, the invention is particularly suitable for the generation of a short pulse of substantially rectangular formation from a pulse of longer duration which may comprise a single step waveform. In such a case it is necessary that the delay network should be designed so that a substantially constant delay is afforded for all frequencies within the frequency range that it is desired to operate. If desired, however, the delay network can, by suitable design, be arranged to distort the applied waveform in a predetermined manner so that a desired waveform is set up at the output terminals from an input waveform of different form. In this aspect of the invention the series elements of the network are chosen so as to be equal in magnitude.

In another aspect of the invention for affording a frequency characteristic or a generated pulse other than of rectangular shape the series or shunt elements of the network are arranged to be of differing magnitudes depending on the shape required.

In order that the said invention may be clearly understood and readily carried into effect, reference will now be made to the accompanying drawings in which—

Figures 1, 2, 3 and 4 are circuit diagrams illustrating various embodiments of the invention, Figures 1a, 2a, 3a and 4a are graphs that indicate the waveforms generated by the use of the circuits shown in Figures 1, 2, 3 and 4, respectively, Figure 5 illustrates a circuit arrangement which may be regarded as the inverse of the arrangement shown in Figure 1 for the purpose of generating a current waveform similar to the voltage waveform shown in Figure 1a.

Figure 9:
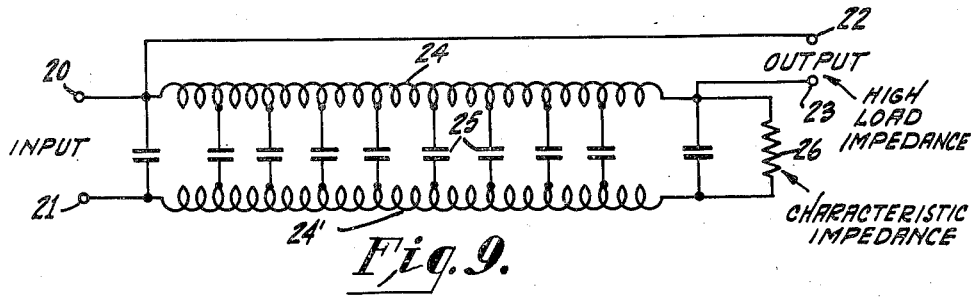
Figure 10:
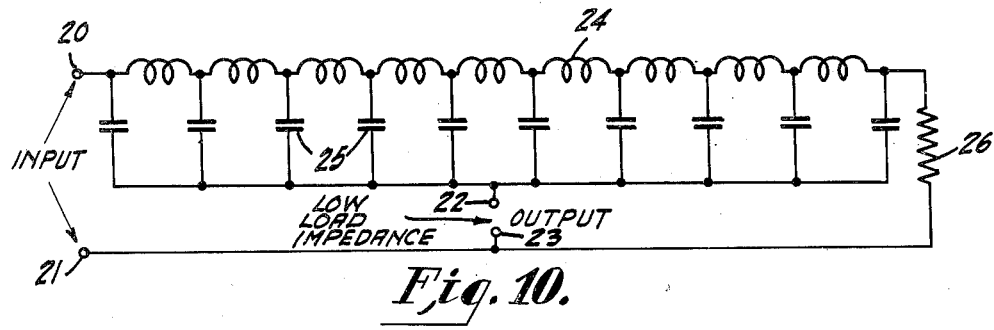
Figure 11:
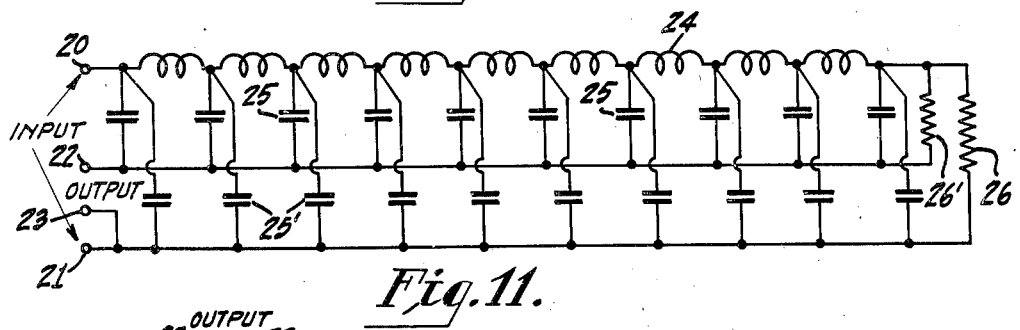
Figure 12:
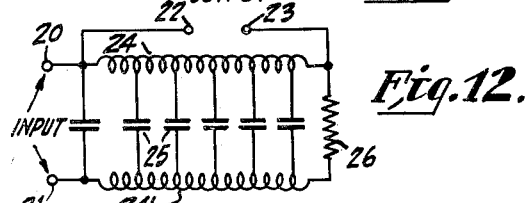
Figure 13:
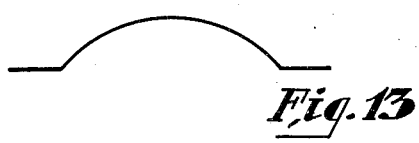
Figure 14:
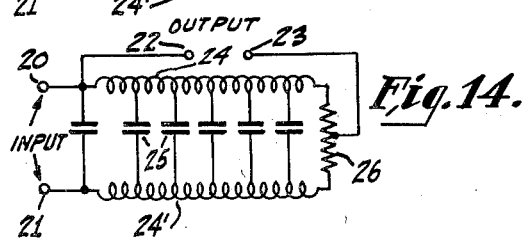
Figure 15:
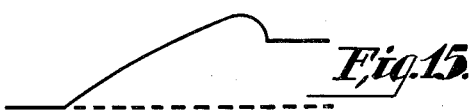

Figure 6 illustrates a circuit arrangement similar to that shown in Figure 1 but modified to generate a voltage waveform similar to that shown in Figure 7, Figure 7 is a graph that shows the voltage waveform generated by the circuit of Figure 6, Figure 8 illustrates a circuit arrangement which may be regarded as the inverse of the arrangement shown in Figure 6 for generating a current waveform similar to that shown in Figure 7, Figures 9 and 9a show networks according to the invention for operating into a load or from a source of substantially infinite impedance, Figure 10 shows a further network according to the invention for operating into a load or from a source of substantially zero impedance, Figure 11 illustrates a modification of the network chosen in Figure 10, Figures 12 and 14 illustrate networks particularly for generating pulses, and Figures 13 and 15 are graphs illustrating the form of pulse generated by the networks of Figures 12 and 14.

Referring to Figure 1, there is shown a delay network comprising two series members indicated by the reference numerals 5 and 6, the series member 5 comprising a plurality of series impedances in the form of inductances, as shown, there being arranged between the two series members a plurality of shunt condensers indicated at 7. At one end of the delay network there is provided on the series member 6 a terminal 8 and on the series member 5 a terminal 10 and at the other end of the network and on the series member 5 there is provided a further terminal 9. The terminal 10 may, if desired, be connected to earth, as shown. The pair of terminals 8 and 10 are connected to an input circuit, not shown, and the terminals 9 and 10 are connected to an output circuit, not shown, so that the output circuit is in effective parallel relationship with the series impedances. The delay network is terminated at one end by a resistance 11 in a substantially reflectionless manner. The delay network shown is of the low-pass type which provides a substantially constant delay for all frequencies from zero up to a predetermined limiting frequency. The invention is, however, not limited to the type of delay network shown since it is also applicable to the case where, for example, a band-pass type of delay network is required. If, for example, the input waveform from which the desired waveform is to be derived is merely a current impulse or a current step, then the low-pass type of delay network can be employed, but where the applied waveform comprises a modulated carrier wave then it will be necessary to employ a delay network of the band-pass type. The design of networks of the low-pass or band-pass type is well understood and no further details regarding the design of the networks will therefore be given.

In the example shown, the terminating resistance 11 is disposed at the end of the delay network remote from the point in the network to which the input circuit is connected and with the input circuit connected at one end of the delay network and assuming, as stated above, that the resistance 11 provides a reflectionless termination for the frequency range for which the network is designed, the impedance presented at the input terminals is a constant pure resistance equal to the characteristic impedance of the delay network. In order to obtain the desired waveform conversion, that is to say, in order for example to develop a substantially rectangular pulse from a substantially right-angle step waveform applied to the input terminals, the impedance of the load or output circuit connected to the output terminals should be very large compared with the characteristic impedance of the network. For example, the required high output circuit impedance may be the input or grid impedance of a valve. The terminal 10, which is maintained at a constant potential may, for example, be connected to the high tension supply line of an amplifier.

Figure 1a of the drawings represents the waveform which is developed by the circuit shown in Figure 1. In this figure the waveform indicated by 12 is the applied waveform and that indicated by the reference numeral 13 is the waveform obtained at the output terminals. It is assumed in this figure that the waveform 12 is in the form of a right-angle step. On applying the waveform 12 to the terminals 8 and 10, there is set up simultaneously at the output terminals 9 and 10 a waveform representative of the wave front of the applied waveform as will be observed from Figure 1a and after a finite time determined by the delay $t$ of the network there is set up at the output terminals a further representation of the wave front of the input waveform but reversed in sense to the first representation. Thus it will be observed from Figure 1a, there is developed by the use of the arrangement shown in Figure 1 a pulse having a duration $t$ which is determined by the time delay of the network from a pulse or step of longer duration. The pulse of duration $t$ is in fact the original step waveform less the step waveform delayed. If the input waveform has a shape other than that mentioned above, the output waveform will, in general, be the difference between the input waveform and the input waveform delayed by a time $t$. This will be the case providing the delay network introduces a substantially constant delay for all frequencies in the frequency range for which the network is designed. As mentioned above, however, this is not an essential feature of the invention since it is possible by suitable design of the network to convert an applied impulsive waveform into an impulsive waveform of a different shape. If the applied pulse is of a duration less than $t$, the output waveform will comprise first a positive pulse followed by a negative pulse separated from the positive pulse by an interval $t$.

In all cases it will be appreciated that there is fed to the output circuit a contribution in turn from each of the series impedances of the delay network. There is thus fed to the output circuit a plurality of contributions in time sequence, that is to say of differing delay, which are time derivatives or substantially time derivatives of the waveform applied to the network by the input circuit or at least of the waveform as developed at the points from which said contributions are made.

This network may be better appreciated if it is kept in mind that if a stepped voltage wave is applied to the input terminals 8 and 10 (Fig. 1), there is a corresponding stepped current that flows through the series coil of the first filter section since the network is purely resistive when terminated in its characteristic impedance. Therefore, the resulting voltage appearing across the series coil of inductance L is $$L\frac{di}{dt}$$

where the current $i$ is a stepped current wave. Since the time derivative $$\frac{di}{dt}$$

of a stepped wave is a pulse, a short voltage pulse appears across said first coil.

Similarly, a delayed stepped current flows through the series coil of the second network section, the delay in this current flow being that introduced by the first network section. The resulting voltage $$L\frac{di}{dt}$$

appearing across the second series coil is a second short voltage pulse that is delayed with respect to the first pulse $$L\frac{di}{dt}$$

This action follows on down the entire length of the network, and the resulting comparatively wide voltage pulse at the output terminals is the sum of all the short voltage pulses $$L\frac{di}{dt}$$

which are displaced with respect to each other in time.

It will be further appreciated from a consideration of Figure 1 that the series member 6 need not necessarily be in the form of a linear conductor since all of the upper electrodes of the condensers 7 can be connected to the terminal 8 so that, in effect, the terminal 8 can be regarded as the series member 6. If desired, a balanced or partially balanced delay network may be employed as by the introduction of inductances in the series member 6. The output voltage wave will, however, in this case not be of the same amplitude as the amplitude of the step waveform applied to the input terminals. In the networks of the subsequent figures also, series element inductances may be inserted in a series member, where such inductances are not indicated, with a corresponding amplitude modification in the output waveform.

Figures 2, 2A:
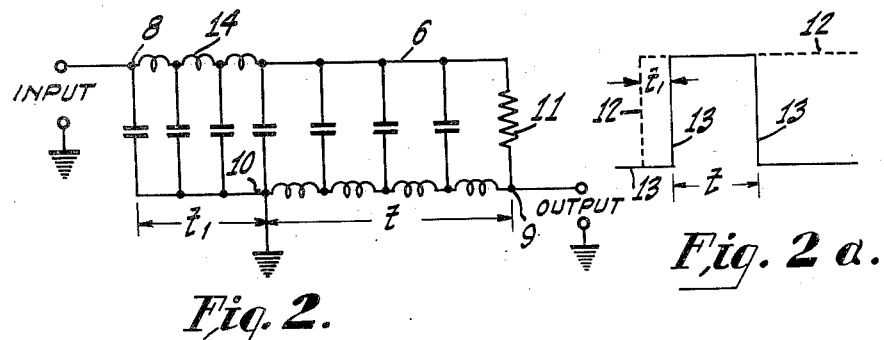

In Figure 2 of the drawings, an arrangement similar to that shown in Figure 1 is employed but in which it is arranged that the output waveform is delayed relatively to the applied waveform. This is accomplished by separating the terminals 8 and 10 by a portion of the delay network as indicated at 14, arranged for example, as shown with inductance elements in the series member 6 and providing a delay $t_1$ equal to the delay required between the applied waveform and the output waveform so that the waveform to be generated does not, as in the case with the arrangement of Figure 1, commence to appear in the output circuit simultaneously with the application of the input waveform.

Figures 3, 3A:
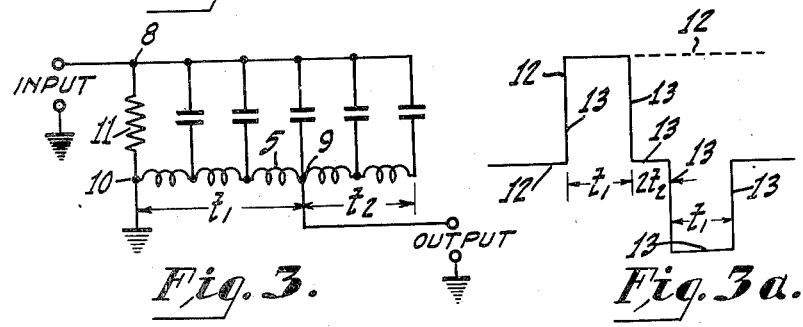

Figure 3 of the drawings indicates an embodiment of the invention in which a terminating resistance 11 for providing a substantially reflectionless termination is disposed at the same end of the network as is the input circuit. The end of the network remote from the input circuit is in this case misterminated by an impedance which is much higher than the characteristic impedance of the network. In the example shown this end of the network is open-circuited and thus misterminated by an infinite impedance. The terminal 9 in this example of the invention is not disposed at the open-circuited end of the network, though it may be so disposed if desired, but is connected to a point on the series member 5 displaced from the open-circuited end. The waveform generated by the use of the circuit shown in Figure 3 is indicated in Figure 3a and is the waveform set up at the output terminals on applying a step waveform to the input terminals. It will be observed from this figure that the output waveform comprises two pulses in anti-phase; first a positive pulse followed by a negative pulse each of a duration $t_1$ which is equal to the time delay between the terminal 10 and the point to which the terminal 9 is connected, the two pulses being separated by a time equal to $2t_2$ where $t_2$ is the time delay between the open-circuited end of the network and the point to which the terminal 9 is connected. If the terminal 9 is disposed at the open-circuited end of the network the interval between the two generated pulses will be reduced to zero. The impedance of the input circuit in this case as well as that of the output or load circuit must be very high compared with the characteristic impedance of the network. The circuit connected to the terminals 8 and 10 may, however, constitute part or the whole of the terminating resistance 11 so that with this modification the impedance presented by the input circuit need not necessarily be of a high value. If desired, of course, the generation of the output waveform may be delayed with respect to the applied waveform in the manner already described with reference to Figure 2.

Figures 4, 4A:
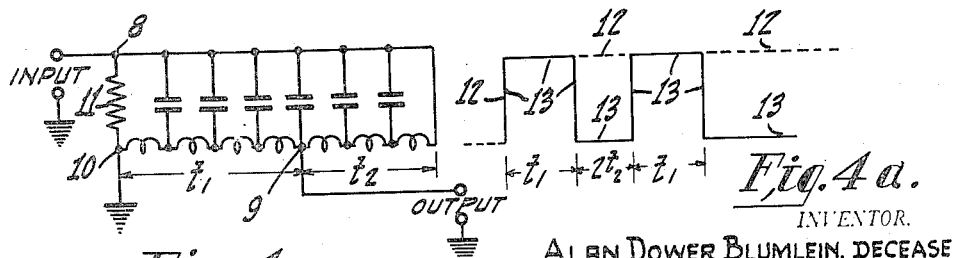

Figure 4 of the drawings illustrates an arrangement similar to that shown in Figure 3 with the exception that instead of the delay network being open-circuited at the end remote from the input circuit, the delay network is closed by an impedance low compared with the characteristic impedance of the network. In the example shown this low impedance is constituted by a short circuit which has the effect of modifying the output waveform compared with that shown in Figure 3a by causing the generation of two pulses of the same phase as shown in Figure 4a.

Clearly, just as with the circuit of Figure 3 the circuit shown in Figure 4 may be modified in the manner according to Figure 2 for obtaining a delayed output waveform.

If the circuit shown in Figure 3 is not completely open-circuited and if the circuit shown in Figure 4 is not completely short-circuited but if they are closed by impedances which approach the impedance of an open-circuit or short-circuit, respectively, then the second pulse which is generated will be of the same form as that shown in Figures 3a and 4a, but will be of smaller amplitude.

Referring now to Figure 5 of the drawings, it will be seen that at one end of the series member 5 there is provided a terminal 8 while the other end of the member 5 is connected to one end of a terminating impedance 11 the other end of which is connected to a terminal 10. A further terminal 9 is provided connected to the series member 6. The terminals 8 and 10 are connected to the input circuit and the terminals 9 and 10 to the output circuit which is of substantially zero impedance and in effective series relation with the shunt condensers 7. When the impedance 11 is chosen to provide a reflectionless termination to the delay network formed by the series members 5 and 6 and the shunt capacities 7 connected between them, the arrangement functions to generate in the output circuit a current waveform identical with the voltage waveform shown in Figure 1a on applying a step waveform to the input terminals.

It will be appreciated that with the network of Figure 5 the waveform generated in the output circuit arises from the contributions of current made in turn from the shunt elements of the delay network. Since these elements are capacitative in nature there is thus fed to the output circuit with differing time delays a plurality of waveforms which are time derivatives of the applied waveform or substantially so or at least of the waveform as developed at the points along the length of the network from which the various contributions are made.

Referring more specifically to the operation of the circuit of Figure 5, the input wave is effectively applied across the terminals 8 and 9 since the load impedance between terminals 10 and 9 is very low. Thus, if a stepped voltage wave is applied to the input terminals, a stepped voltage wave travels down the delay line and appears successively across the shunt capacitors 7. The resulting current flow through each capacitor 7 is $$i = C\frac{de}{dt}$$

where C is the capacity of the capacitor 7 and where $e$ is the stepped voltage across the capacitor 7. This time derivative $$\frac{de}{dt}$$

is a current pulse. Just as in the case of the time derivative voltage pulses $$\frac{di}{dt}$$

discussed with reference to Figure 1, the short time derivative current pulses $$\frac{de}{dt}$$

combine at the output load impedance to provide a comparatively wide pulse, this being a current pulse in the present instance.

Figure 6 of the drawings illustrates an arrangement for developing across a substantially infinite impedance load a voltage waveform similar to that shown in Figure 7 upon the application of a step-waveform to the input terminals. The network shown in Figure 6 is similar to that shown in Figure 1 with the exception that some of the inductances of the series member 5 are transferred to the series member 6 as indicated at 5'. The network commencing from the input terminals 8 and 10 thus comprises a group of sections having a predetermined time delay corresponding to the time $t_1$ of Figure 7, a second group of sections 5' having a time delay $t_2$ giving a zero output as indicated in Figure 7 and a further group of sections having a time delay $t_3$. The infinite impedance load is connected across the output terminals 9 and 10.

Figure 8 of the drawings illustrates a circuit for generating a current waveform similar to that shown in Figure 7 in a substantially zero impedance load upon the application of a step-waveform to the input terminals. The arrangement shown in Figure 8 is similar to the arrangement shown in Figure 5 with the exception that some of the shunt elements 7' are connected to the terminal 10 instead of the terminal 8 as shown in Figure 5.

Although in the arrangements described above the input circuit is connected to the terminals 8 and 10 and the output circuit is connected to the terminals 9 and 10 it will be understood that according to the reciprocity theorem these circuits may be interchanged, i. e., the input circuit may be connected to the terminals 9 and 10 and the ouput circuit to the terminals 8 and 10 when the arrangements will function without modification of their operation, provided that the impedances presented to the terminals of the network remain unaltered as a result of the interchange of the input and output circuits.

Referring now to Figure 9, the terminals 20, 21 and 22, 23 are the input and output terminals, respectively, of a circuit according to a further form of the invention and terminals 20, 21 are also input terminals to the low-pass delay network formed by the series element inductances 24, 24', which in general vary in magnitude along the length of the other network, and the shunt condensers 25. The delay network is preferably terminated so as to operate without reflection by the terminating impedance 26. The condensers 25 are all of the same capacity or may vary in capacity along the length of the network in a suitable way if found convenient; in either case in all sections of the network given one inductance element 24, it is preferred to make the remaining element 24' of the same section such that the same characteristic impedance is maintained along the length of the network. If the capacity of the condensers remains constant along the network then in this preferred condition the total inductance per section will likewise be constant. If the characteristic impedance is not arranged to be uniform, then reflections will be established along the length of the network which, depending upon the variation in characteristic impedance may render it impossible to obtain a desired frequency characteristic, or may be of sufficient magnitude to disturb the operation of the network unless allowance is made for them.

In the case where it is arranged that the network shall function without generating reflections then on applying a stepped waveform to the terminals 20, 21 of the network the stepped wave front will propagate down the network without substantial change of form if the passband of the network is sufficiently wide and in those few inductance elements 24 where the wave front is present at any instant there will be generated an electromotive force which constitutes the total electromotive force beween the terminals 22, 23. This electromotive force will be proportional to the inductance of those series elements 24 in which the wave front is present at the given instant. It is possible therefore that by suitably choosing the inductance of the series elements along the length of the network a predetermined variation in output potential difference can be achieved.

With the network shown the output collapses completely when the wave front reaches the end of the network. If desired, however, the terminal 23 instead of being connected to the top of the terminating impedance 26 as shown may be taken to some other suitable point on this impedance so that a potential drop across part at least of the impedance 26 when the wave front reaches the end of the network is included in the output whereby, for example, the output level may be made to remain equal to that level reached when the wave front traverses the last few sections of the network. In fact any predetermined output response may be achieved, not only by including in the output a potential drop appearing across part of the impedance 26, but also for example, by including in the output a drop of potential appearing across a resistance shunted across the input terminals 20, 21 of such magnitude as to balance out the electromotive force induced in the first few series inductance elements. The remaining series elements may be so proportioned that the output response may be arranged, for example, to diverge initially either negatively or positively from zero and tend to some final level in, for example, a smooth fashion, with or without superposed oscillation, the final level being determined by whatever drop of potential there may be included finally in the output. If this response corresponds to a certain desired frequency response, then the network will exhibit in operation the desired frequency response.

In a modification, shown in Fig. 9a, of the arrangement just described, instead of utilizing the inductive electromotive forces generated in the series elements of the network directly in the output circuit, the output circuit may be coupled to each of the series elements by mutual inductive coupling. This has the advantage that some of the electromotive forces contributed by the series elements may be arranged to operate in a negative sense so that a negative output is obtainable without the inclusion in the output circuit of an initial standing drop of potenial. In his modification the series elements may be of the same or different magnitudes and the desired varying electromotive forces may be obtained by varying the degree of coupling.

In a further modification the delay network may be completely unbalanced so that one side of the network contains no series impedance. The shunt condensers are then preferably chosen so that corresponding to the smooth variation of inductance of the sections along the length of the network there is a smooth variation of the characteristic impedance.

It will be appreciated that in all cases the output waveform is generated as a plurality of contributions of differing amplitude and time delay derived from the series elements of the delay network and in the form of time derivatives or substantially such of the waveform applied to the network or of the waveform as developed at the points along the length of the network from which the contributions are made.

The arrangement described with reference to Figure 9 requires to operate into a load of substantially infinite impedance. Figure 10, however, shows what may be regarded broadly as the inverse network to that of Figure 9 which requires to operate into a load of substantially zero impedance. Terminals 20, 21 remain the input terminals of the network of the invention and of the low-pass delay network formed by the series inductive elements 24 and shunt condensers 25, the delay network in this case being of the completely unbalanced variety. As in Figure 9 also the delay network is terminated by the impedance 26 so as to operate substantially without reflection at the far end, on the other hand, instead of arranging the output terminals 22, 23 of the network so that the series effect of a number of electromotive forces is obtained in the output circuit as is the case in the circuit of Figure 9, the output terminals 22, 23 are arranged in the circuit of Figure 10 so that a number of currents flowing in parallel paths, namely, the currents flowing in the shunt elements 25 are combined in the output circuit. So that different shunt elements shall contribute different currents to the output, it may be arranged that the capacity of the various shunt condensers 25 varies smoothly along the length of the network. In this case to preserve a smoothly changing characteristic impedance and thereby reduce reflected energy to a minimum, it is necessary to proportion the series inductive elements 24 accordingly.

On the other hand, it may be more convenient to split some or all of the shunt elements as shown in Figure 11, keeping the total shunt capacity of an element constant so that advantageously a constant characteristic impedance is obtainable along the length of the network. As shown in Figure 11, the shunt elements 25 are split by the provision of elements 25' connected in the manner shown. The elements 25 are therefore also associated with the output circuit and are appropriately chosen to give the desired output response which in the case of either Figure 10 or 11, it will be clear is developed as a plurality of derived waveforms differing in time delay and amplitude and being each substantially the time derivative of the waveform applied to the network or developed at the point on the network from which the contribution is made. The terminating impedance 26 may if desired likewise be split by the provision of an impedance 26' connected as shown, the combined effect of its components however being such that the network is terminated properly, the connecting of the impedance 26' to terminal 22 as shown allowing a final standing current to be carried by the output circuit when a step wave is applied to the network. Any convenient arrangement may be adopted for setting up an initial standing current in the output circuit. So that negative contributions of current may be made to the output circuit, the delay network may be duplicated, the second delay network being fed in antiphase to the first but contributing current in a similar manner.

The networks described are particularly suitable for use as filter networks having predetermined frequency or phase characteristics. Thus, on applying signals to the input terminals of the network only those signals falling within the predetermined characteristic of the network will be present at the output terminals. The networks according to the invention can, however, be employed in pulse generating apparatus whereby pulses shaped by the networks can be generated on applying to the input terminals a pulse, for example, of step waveform.

The application of the invention to apparatus for generating pulses will be more fully described with reference to Figures 12 to 15.

Referring now to Figure 12, the arrangement shown in this figure serves to generate a pulse of the waveform shown in Figure 13 on applying a step waveform to the input terminals. The series inductance elements 24 are made to increase and then decrease in magnitude along the length of the delay network so that as the propagating wave front traverses the length of the network greater or lesser electromotive forces are generated in the output circuit of the network depending on the magnitude of the series inductive elements where the wave front is present at any instant. In order that a constant characteristic impedance shall be maintained along the length of the delay network thereby avoiding disturbing reflections the necessary extra inductance to achieve a constant characteristic impedance is inserted in the opposite side of the delay network as indicated at 24'. Thus, wherever the elements 24 are large, those on the opposite side of the network, namely, 24', are small, and where the elements 24 are small their counterparts 24' are large. The shunt capacitative elements 25 are all of equal magnitude.

For generating a current waveform of the kind shown in Figure 13 in a zero impedance load the network of Figure 12 can be modified in the manner described with reference to Figure 10 or 11.

The network shown in Figure 14 is the same as that of Figure 12, except that terminal 23 instead of being taken to the top of the terminating resistance 26 is taken to some tapping point intermediate the ends of the resistance 26 so that when the stepped wave front is propagated to the end of the network, a steady potential drop is included in the output circuit so that the impulsive waveform generated commences at one end level and finishes at another level as shown in Figure 15. A current waveform of the shape shown in Figure 15 can also be generated by suitable modification of the network as described above.

If desired, the invention may be utilized to provide impulsive waveforms which contain negative portions. Such waveforms may be produced by networks which are simple modifications of those already described. Thus, if in those circuits where the output terminals are coupled with the series inductive elements of the networks the coupling is effected by means of mutual inductive coupling, it will be clear that the electromotive forces generated in some elements may be made to function in the output circuit in opposite sense to that in which they would according to the circuits illustrated by the figures by the simple procedure of reversing the sense of the mutual coupling in the case of those elements. In these circuits where shunt capacitative elements contribute current to the load circuit, negative contributions of current may be made by drawing some contributions from the shunt elements of another delay network to which the stepped waveform is applied in reverse sense. Alternatively, negative excursions of waveform may be achieved by the inclusion in the output circuit of a negative standing current or potential difference set up initially in any suitable way upon the application of the stepped waveform but for those portions of the waveform which are desired to be positive being outweighed by positive contributions from the elements of the network of appropriate magnitude.

Although in the foregoing description of Figures 9 to 15, terminals 20, 21 have been termed the input terminals of the network and terminals 22, 23 the output terminals, it will be clear from the reciprocity that holds in linear passive networks that as in the case of the circuits previously described in connection with Figures 1 to 8, identical results will follow if input and output terminals are interchanged, the impedances presented to the network, however, remaining unaltered. Moreover, it will be understood that, although the invention has for simplicity been described with reference to a delay network of the low-pass variety, other types may be employed if desired; for example, a band-pass type, in which case the network will achieve, for example, the shaping of the envelope of a high-frequency wave impulse.

In all forms of the invention it is preferred to employ a large number of sections in the delay network so that the network is of a finely divided nature whereby the plurality of derived waveforms which are fed to the output circuit approximate very closely to time derivatives of the waveform which propagate down the network. It is, however, possible to employ networks which are not so finely divided in which case the derived waveforms may not approximate so closely to time derivatives of the propagated waveform.

What is claimed is:

1. An electric circuit arrangement having a predetermined frequency characteristic comprising a delay network having series and shunt elements forming a cascade of sections, said network having an input circuit and having an output circuit connected across at least a portion of the series elements of said network so that on the application of a waveform to said network by said input circuit there is fed to said output circuit a plurality of derived waveforms of differing time delay which are substantially time derivatives of said applied waveform as developed at points along the length of said delay network, and a load impedance included in said output circuit and in said input circuit so that said derived waveforms and said applied waveform add algebraically at said load impedance.

2. An electric circuit arrangement according to claim 1 employed for the generation of desired impulsive waveforms in said output circuit, wherein said input circuit is arranged to apply an impulsive waveform to said network and wherein said elements are so chosen in relation to one another that said desired waveform is generated in said output circuit.

3. An electric circuit arrangement according to claim 1 having means for terminating one end of said delay network in a substantially reflectionless manner.

4. An electric circuit arrangement according to claim 1 wherein an end of said network remote from the point in said network to which said input waveform is applied is terminated in a substantially reflectionless manner and the arrangement is such that, in operation, the impedance presented to said input or output circuit by said network is substantially constant during operation.

5. An electric circuit arrangement according to claim 1 wherein one of the ends of said output circuit is effectively connected to said network at the same point as is one of the ends of said input circuit so that said desired waveform commences to appear in said output circuit simultaneously with the application of said input waveform.

6. An electric circuit arrangement according to claim 1 wherein said series elements of said network lie in one or the other of the two series members of said network between which said shunt elements are connected and said series elements are so distributed that said network consists of a plurality of sections at least one of which has the series element of the section connected in one of said series members while in each of the rest of said sections the series element is connected in the other of said series members.

7. An electrical delay network comprising a plurality of sections connected in cascade, each section including a series inductance coil and a shunt capacitor, said network having input terminals at one end thereof to which an electrical wave may be applied and having a load impedance so connected between the input end of the network and the output end of the network that there appears across said load impedance the sum of a plurality of time derivatives of said applied wave which are delayed with respect to each other.

8. An electrical delay network comprising a plurality of sections connected in cascade, each section including a series inductance coil and a shunt capacitor, said network having input terminals at one end thereof to which an electrical wave may be applied and being terminated in its characteristic impedance at the other end thereof, and an output load impedance so connected between the input end of the network and the output end of the network that there appears across said output terminals the sum of a plurality of time derivatives of said applied wave which are delayed with respect to each other.

9. An electrical delay network comprising a plurality of sections connected in cascade, each section including a series inductance coil and a shunt capacitor, said network having input terminals at one end thereof and being terminated in its characteristic impedance at the other end thereof, and a load impedance so connected between the output end of said network and the input end of said network that a wave applied to said input terminals and the resulting delayed wave appearing at the other end of the network add algebraically at said load impedance.

10. An electrical delay network comprising a plurality of sections connected in cascade, each section including a series inductance coil and a shunt capacitor, said network having input terminals at one end thereof and having a load impedance so connected between an output terminal of said network and an input terminal of said network that a wave applied to said input terminals adds algebraically to the resulting delayed wave.

11. An electrical delay network comprising a plurality of sections connected in cascade, each section including a series inductance coil and a shunt capacitor, said network having input terminals at one end thereof and having means comprising a pair of output terminals connected across a plurality of said series coils for supplying the sum of the voltages appearing across said series coils to a load or utilization circuit.

12. An electrical delay network comprising a plurality of sections connected in cascade, each section including a series inductance coil and a shunt capacitor, said network having input terminals at one end thereof and being terminated in its characteristic impedance at the other end thereof, and means comprising a pair of output terminals across a plurality of said series coils for taking off the voltage appearing thereacross.

DOREEN WALKER,
*Legal Representative for Alan Dower Blumlein, Deceased.*

REFERENCES CITED

The following references are of record in the file of this patent:

UNITED STATES PATENTS

| Number | Name | Date |
|---|---|---|
| 1,697,945 | Beverage | Jan. 8, 1929 |
| 2,145,332 | Bedford | Jan. 31, 1939 |
| 2,212,967 | White | Aug. 27, 1940 |
| 2,247,941 | Crosby | July 1, 1941 |
| 2,266,154 | Blumlein | Dec. 16, 1941 |